(12) United States Patent
Suzuki

(10) Patent No.: US 8,045,044 B2
(45) Date of Patent: Oct. 25, 2011

(54) CAMERA MODULE COMPRISING THREE MEMBERS

(75) Inventor: Takahiro Suzuki, Sagae (JP)

(73) Assignee: Mitsumi Electric Co., Ltd., Tama-Shi, Tokyo (JP)

( * ) Notice: Subject to any disclaimer, the term of this patent is extended or adjusted under 35 U.S.C. 154(b) by 394 days.

(21) Appl. No.: 12/436,216

(22) Filed: May 6, 2009

(65) Prior Publication Data

US 2009/0278978 A1    Nov. 12, 2009

(30) Foreign Application Priority Data

May 9, 2008    (JP) .................................. 2008-123217

(51) Int. Cl.
*H04N 5/225* (2006.01)
(52) U.S. Cl. ........................ 348/340; 348/335
(58) Field of Classification Search .................. 348/340, 348/335, 65; 396/133; 359/822
See application file for complete search history.

(56) References Cited

U.S. PATENT DOCUMENTS

| | | | | |
|---|---|---|---|---|
| 5,557,327 A | * | 9/1996 | Hasegawa et al. | 348/340 |
| 5,847,887 A | * | 12/1998 | Ogura et al. | 359/822 |
| 7,570,880 B2 | * | 8/2009 | Yoon et al. | 396/133 |
| 2006/0028320 A1 | | 2/2006 | Osaka | |
| 2007/0116445 A1 | | 5/2007 | Kozakai et al. | |
| 2007/0183773 A1 | | 8/2007 | Aoki et al. | |

FOREIGN PATENT DOCUMENTS

| | | |
|---|---|---|
| EP | 1 701 182 A1 | 9/2006 |
| JP | 2006-258969 A | 9/2006 |
| JP | 2006-284628 A | 10/2006 |
| KR | 2007-0001667 A | 1/2007 |
| WO | WO 2009/096664 A1 | 8/2009 |

OTHER PUBLICATIONS

Extended European Search Report dated Dec. 9, 2009 (7 pages), issued in counterpart European Application Serial No. 09159330.1.

* cited by examiner

*Primary Examiner* — Tuan Ho

(74) *Attorney, Agent, or Firm* — Holtz, Holtz, Goodman & Chick, P.C.

(57) ABSTRACT

A camera module includes an actuator body movably supporting a lens assembly along the direction of an optical axis of a lens, a sensor board on which an image pickup device is mounted, a base member disposed between the actuator body and the sensor board. The base member consists of one member which acts as an actuator base and a sensor base.

7 Claims, 7 Drawing Sheets

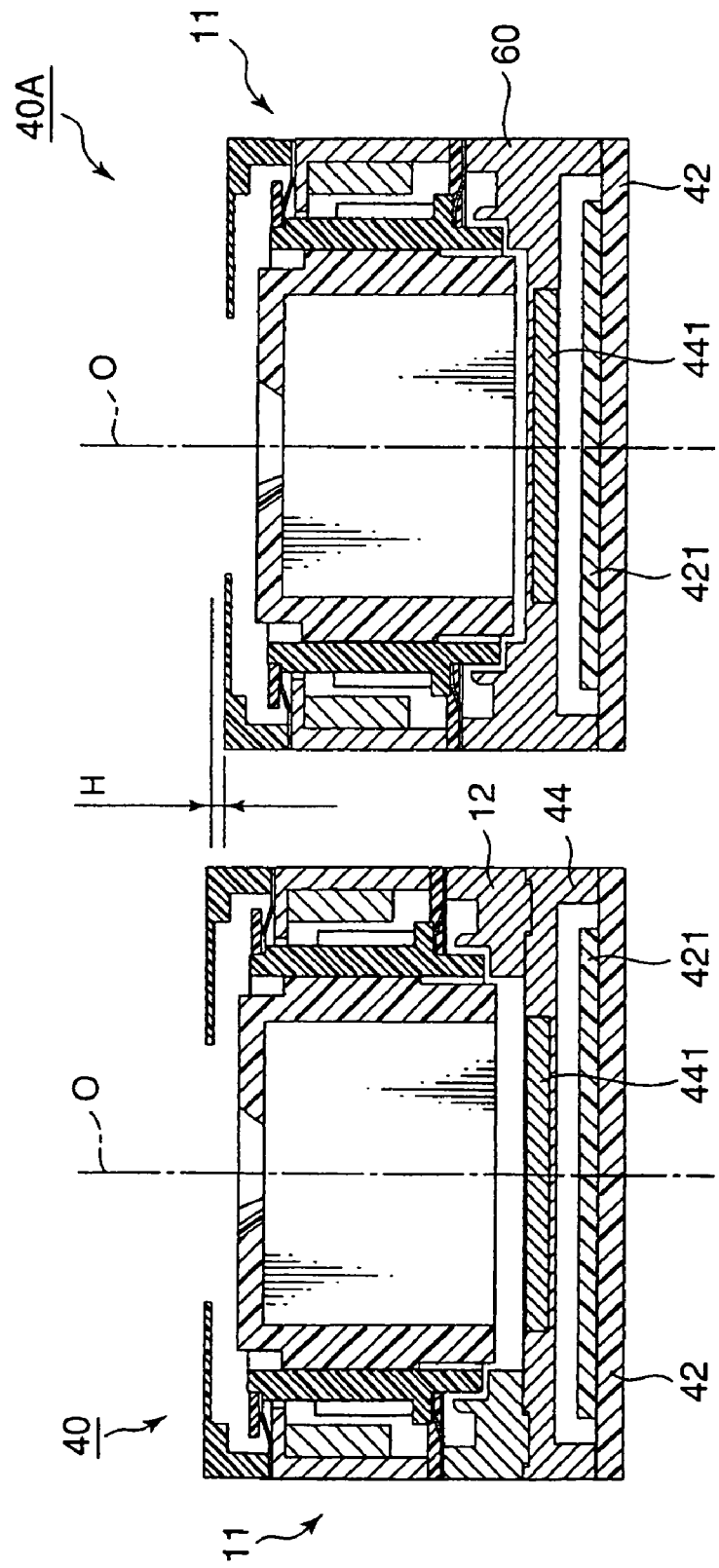

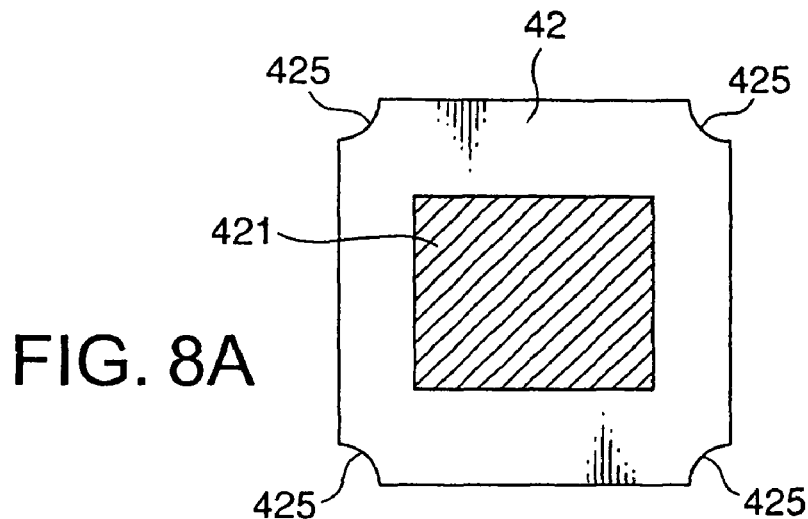
FIG. 8A
FIG. 8B
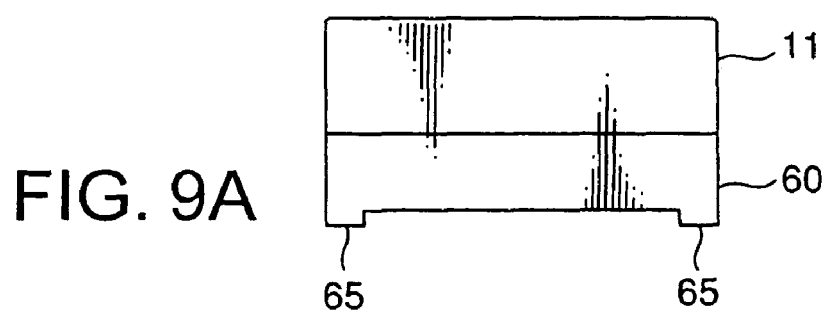
FIG. 9A
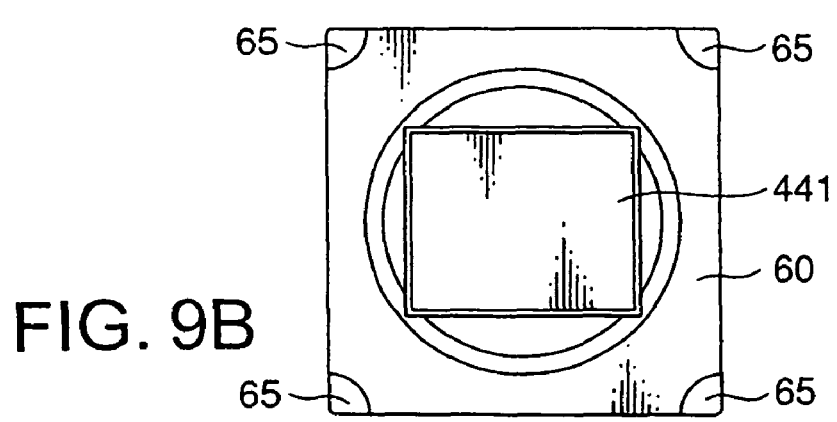
FIG. 9B

CAMERA MODULE COMPRISING THREE MEMBERS

This application is based upon and claims the benefit of priority from Japanese Patent Application JP 2008-123217, filed on May 9, 2008, the disclosure of which is incorporated herein in its entirety by reference.

BACKGROUND OF THE INVENTION

This invention relates to a camera module and, in particular, to an autofocus camera module for use in a portable compact camera.

The portable compact camera is mounted in a camera-equipped cellular mobile phone. The portable compact camera is provided with the autofocus camera module. Previously, various autofocus camera modules have been proposed.

By way of illustration, Japanese Unexamined Patent Application Publication No. 2006-258969 (JP-A-2006-258969) (which will be also called a first patent document) discloses a camera-equipped cellular mobile phone which is capable of shortening a time required for automatic focusing. The camera-equipped cellular mobile phone (a camera module) disclosed in the first patent document comprises an actuator (a lens driving device) for movably supporting a lens (a lens assembly, a lens barrel) along the direction of an optical axis of the lens, a sensor board on which an image pickup device and electronic parts are mounted, and a sealing member disposed between the above-mentioned actuator and the sensor board. By combining with the sensor board, the sealing member forms an enclosed space for sealing the image pickup device and the electronic parts. The actuator comprises an actuator body and an actuator base. The sealing member is also referred to as a sensor base. That is, a conventional camera module comprises four members (parts): the actuator body, the actuator base, the sensor base, and the sensor board.

The actuator body disclosed in the first patent document comprises a holder (a lens holder) including a tubular portion having an end to which the lens (the lens assembly, the lens barrel) is mounted, a driving coil fixed to the holder (the lens holder) so as to position around the tubular portion of the holder, a yoke comprising a permanent magnet opposite to the driving coil, a pair of leaf springs disposed to both sides of the tubular portion of the holder (the lens holder) in the direction of the optical axis. The pair of leaf springs supports the holder (the lens holder) in the direction of the optical axis shiftably so as to position the holder (the lens holder) in a radial direction. By energizing the driving coil, it is possible to positionally adjust the lens (the lens assembly) in the direction of the optical axis according to interaction between a magnetic field of the permanent magnet and a magnetic field due to an electric current flowing through the driving coil. In the pair of leaf springs, the one is called an upper leaf spring (a front-side spring), the other is called a lower leaf spring (a rear-side spring). The upper leaf spring (the front-side spring) has an inner end portion which is sandwiched between an upper end (a front end) of the holder and a stopper to be fitted to the holder (the lens holder).

Disclosed in the first patent document, the conventional camera module has problems as follows.

A first problem is that it is difficult to assemble the camera module with high position accuracy. This is because the conventional camera module comprises the four members (parts): the actuator body, the actuator base, the sensor base, and the sensor board.

A second problem is that the camera module has a high cost. This is because, in order to assemble the actuator base with the sensor base, it is necessary to provide with a sing-shaped convex portion and a ring-shaped concave portion preventing the entry of dirt and the entry of light in the manner which will later be described in conjunction with FIGS. 1 and 2. In addition, in order to assemble the actuator base with the sensor base, it is necessary to subject evaporation processing of a shielding film to both of them to shield them in common.

A third problem is that it is difficult to lower a height of the camera module. This is because, inasmuch as the conventional camera module comprises the four members (parts): the actuator body, the actuator base, the sensor base, and the sensor board, the height thereof becomes high due to thicknesses of the respective members (parts).

SUMMARY OF THE INVENTION

It is therefore an exemplary object of the present invention to provide a camera module which is capable of assemble it with high position accuracy.

It is another object of the present invention to provide a camera module which is capable of manufacturing it at a low cost.

It is still another object of the present invention to provide a camera module which is capable of lowering the height thereof.

Other objects of this invention will become clear as the description proceeds.

On describing the gist of an exemplary aspect of this invention, a camera module includes an actuator body for movably supporting a lens assembly along a direction of an optical axis of a lens, a sensor board on which an image pickup device is mounted; and a base member disposed between the actuator body and the sensor board The base member consists of one member which acts as an actuator base and a sensor base.

BRIEF DESCRIPTION OF THE DRAWING

FIGS. 7A and 7B are cross-sectional views of the related camera module and the camera module according to the exemplary embodiment of this invention with heights of them compared;

FIG. 8A is a plan view of a sensor board for use in the camera module illustrated in FIG. 5;

FIG. 8B is a front view of the sensor board illustrated in FIG. 8A;

FIG. 9A is a front view of an actuator section for use in the camera module illustrated in FIG. 5;

FIG. 9B is a bottom view of the actuator section illustrated in FIG. 9A;

DESCRIPTION OF THE EXEMPLARY EMBODIMENTS

Figure 1:
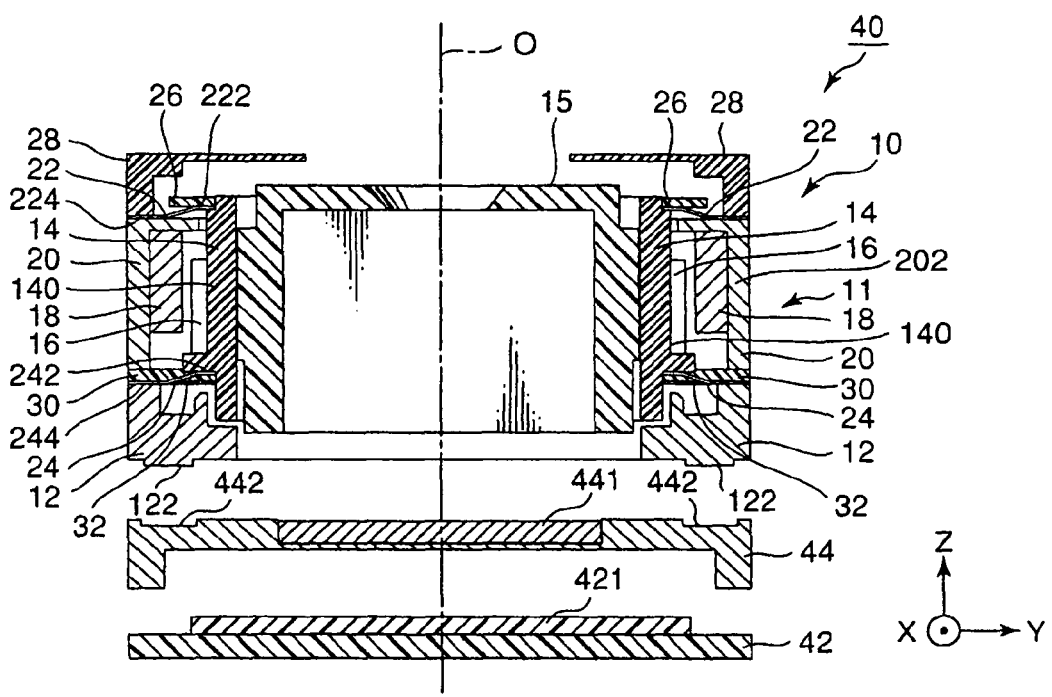
FIG. 1 is an exploded cross-sectional view of a related camera module.
Figure 2:
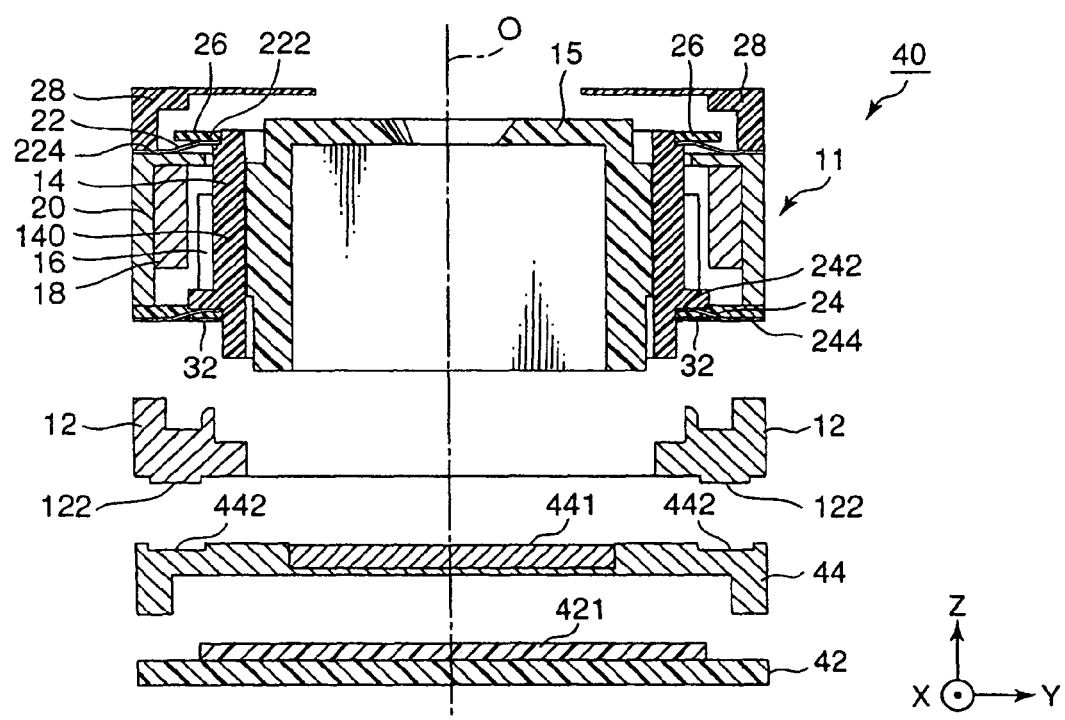
FIG. 2 is an exploded cross-sectional view of the related camera module.

Referring to FIGS. 1 and 2, a related camera module 40 will be described at first in order to facilitate an understanding of the present invention. FIGS. 1 and 2 are exploded cross-sectional views of the related camera module 40.

Herein, in the manner shown in FIGS. 1 and 2, an orthogonal coordinate system (X, Y, Z) is used. In a state illustrated in FIGS. 1 and 2, in the orthogonal coordinate system (X, Y, X), an X-axis direction is a fore-and-aft direction (a depth direction), a Y-axis direction is a left-and-right direction (a width direction), and a Z-axis direction is an up-and-down direction (a height direction). In addition, in the example being illustrated in FIGS. 1 and 2, the up-and-down direction Z is a direction of an optical axis O of a lens.

However, in an actual use situation, the direction of the optical axis O, namely, the Z-axis direction becomes a fore-and-aft direction. In other words, an upper direction of the Z-axis becomes a front direction while a lower direction of the Z-axis becomes a rear direction.

As shown in FIG. 1 the camera module 40 comprises an actuator (a lens driving device) 10 for movably supporting a lens assembly 15 along the direction of the optical axis O of the lens, a sensor board 42 on which an image pickup device 421 and electronic parts (not shown) are mounted, and a sensor base 44 disposed between the above-mentioned actuator 10 and the sensor board 42. An infrared cutting filter 441 is mounted on the sensor base 44.

As shown in FIG. 2, the actuator 10 comprises an actuator body 11 and an actuator base 12. In the manner described above, the related camera module 40 comprises four members (parts): the actuator body 11, the actuator base 12, the sensor base 44, and the sensor board 42.

The illustrated actuator (the lens driving device) 10 is mounted to a camera-equipped cellular mobile phone which is enable to automatic focusing. The actuator (the lens driving device) 10 is for moving the lens assembly 15 in the direction of the optical axis O. The actuator (the lens driving device) 10 comprises the actuator base 12 which is disposed in a lower side (a rear side) in the Z-axis direction (the direction of the optical axis O). The actuator base 12 has a lower portion (a rear portion) on which the image pickup device 421 disposed on the sensor board 42 is mounted. The image pickup device 421 picks up a subject image formed by the lens assembly 15 to convert it into an electric signal. The image pickup device 421 may, for example, comprise a CCD (charge coupled device) type image sensor, a CMOS (complementary metal oxide semiconductor) type image sensor, or the like. Accordingly, the camera module 40 comprises a combination of the actuator (the lens driving device) 110, the sensor board 42 on which the image pickup device 421 is mounted, and the sensor base 44.

The actuator (the lens driving device) 10 comprises a lens holder 14 including a tubular portion 140 for holding the lens assembly 15, a driving coil 16 fixed to the lens holder 14 so as to position around the tubular portion 140 thereof, a yoke 20 comprising a permanent magnet 18 opposite to the driving coil 16, a pair of leaf springs 22 and 24 disposed to both sides of the tubular portion 140 of the lens holder 14 in the direction of the optical axis O. The pair of leaf springs 22 and 24 supports the lens holder 14 in the direction of the optical axis O shiftably so as to position the lens holder 14 in a radial direction. In the pair of leaf springs 22 and 24, the one leaf spring 22 is called an upper leaf spring, another leaf spring 24 is called a lower leaf spring.

In addition, in the manner which is described above, in the actual use situation, the upper direction in the Z-axis direction (the direction of the optical axis O) becomes the front direction while the lower direction in the Z-axis direction (the direction of the optical axis O) becomes the rear direction. Accordingly, the upper leaf spring 22 is also called a front-side spring while the lower leaf spring 24 is also called a rear-side spring.

The yoke 20 includes an outer tubular portion 202 having an inner surface on which the permanent magnet 18 is disposed with a space between it and the driving coil 16.

The upper leaf spring (the front-side spring) 22 is disposed at an upper side (a front side) of the lens holder 14 in the direction of the optical axis O while the lower leaf spring (the rear-side spring) 24 is disposed at a lower side (a rear side) of the lens holder 14 in the direction of the optical axis O. The upper leaf spring (the front-side spring) 22 and the lower leaf spring (the rear-side spring) 24 have the substantially same structure.

More specifically, the upper leaf spring (the front-side spring) 22 comprises an inner end portion 222 mounted on the lens holder 14 and an outer end portion 224 mounted on the yoke 20. Between the inner end portion 222 and the outer end portion 224, three arm portions are provided. Each arm portion connects the inner end portion 222 to the outer end portion 224.

Likewise, the lower leaf spring (the rear-side spring) 24 comprises an inner end portion 242 mounted on the lens holder 14 and an outer end portion 244 mounted on the yoke 20. Between the inner end portion 242 and the outer end portion 244, three arm portions are provided. Each arm portion connects the inner end portion 242 to the outer end portion 244.

The inner end portion is also called an inner ring while the outer end portion is also called an outer ring.

In addition, the inner end portion 222 of the upper leaf spring (the front-side spring) 22 is sandwiched between the lens holder 14 and a stopper 26 to be fixed to them. In other words, the stopper 26 is fitted to the lens holder 14 so as to sandwich the inner end portion 222 of the upper leaf spring (the front-side spring) 22 between it and the lens holder 14. On the other hand, the outer end portion 224 of the upper leaf spring (the front-side spring) 22 is sandwiched between the yoke 20 and a cover 28 to be fixed to them.

The stopper 26 has functions as follows. That is, the stopper 26 has a function for bringing the inner end portion 222 of the upper leaf spring (the front-side spring) 22 into intimate contact with the lens holder 14 without variations and with very high precision. It is therefore possible to improve variations in a VCM (voice coil motor) characteristic. In addition, the stopper 26 has a function for improving the adherability of the upper leaf spring (the front-side spring) 22. Accordingly, the lens driving device 10 has an improved impact-resistance. Furthermore, the stopper 26 has a function for preventing deformation of the upper leaf spring (the front-side spring) 22 on a drop impact of the lens driving device 10. Accordingly, the lens driving device 10 has also the improved impact-resistance. The stopper 26 has a function for determining a mechanical stroke of the lens driving device 10.

On the other hand, the outer end portion 244 of the lower leaf spring (the rear-side spring) 24 is fixed to the yoke 20 through a spacer 3. In other words, the spacer 30 and the outer end portion 244 of the lower leaf spring (the rear-side spring) 24 are sandwiched between the yoke 20 and the actuator base 12 to be fixed to them. The inner end portion 242 of the lower leaf spring (the rear-side spring) 24 is fixed to the lens holder 14 at a lower end (a rear end) side thereof.

The tubular portion 140 of the lens holder 14 has an inner wall in which a female screw thread (not shown) is cut. On the other hand, the lens assembly 15 has an outer wall in which a male screw thread (not shown) screwed in the above-mentioned female screw thread is cut. In a case of fitting the lens assembly 15 to the lens holder 14, it includes the steps of rotating the lens assembly 15 with respect to the tubular portion 140 of the lens holder 14 around the optical axis O to screw it along the direction of the optical axis O thereby accommodating the lens assembly 15 in the lens holder 14, and of connecting them to each other via an adhesive agent or the like.

By energizing the driving coil 16, it is possible to positionally adjust the lens holder 14 (the lens assembly 15) in the direction of the optical axis O according to interaction between a magnetic field of the permanent magnet 18 and a magnetic field due to an electric current flowing through the driving coil 16.

A sheet-like electrode 32 is disposed between the lower leaf spring (the rear-side spring) 24 and the actuator base 12. The sheet-like electrode 32 is for supplying the driving coil 16 with power.

The actuator base 12 has an undersurface on which a ring-shaped convex portion 122 is provided. On the other hand, the sensor base 44 has an upper surface on which a ring-shaped concave portion 442 is provided at a position corresponding to the ring-shaped convex portion 122. The ring-shaped convex portion 122 and the ring-shaped concave portion 442 are for preventing the entry of dirt and the entry of light.

Now, the description will be made as regards a method of manufacturing the related camera module 40 illustrated in FIGS. 1 and 2.

First, the infrared cutting filter 441 is mounted to the sensor base 44. At this time, a thermosetting adhesive resin is applied to them to cure the resin by thermocompression bonding. Subsequently, the sensor base 44 is mounted on the sensor board 42. At this time, a thermosetting adhesive resin is applied to them to cure the resin by thermocompression bonding. Thereby, a sensor section is manufactured. A protection tape is affixed to such a manufactured sensor section (42, 44) and the sensor section (42, 44) is temporarily kept.

Subsequently, the protection tape is peeled off the sensor section (42, 44) and the actuator 10 is mounted on the sensor section (42, 44). At this time, an X-Y adjustment is carried out, a UV resin is applied to them to provisionally cure the UV resin thereby provisionally fixing them. Next, a thermosetting adhesive resin is applied to them to cure the resin by thermocompression bonding. In the manner which is described, the camera module 40 is manufactured.

Disclosed in the above-mentioned first patent document, the related camera module illustrated in FIGS. 1 and 2 has problems as follows.

A first problem is that it is difficult to assemble the camera module 40 with a high position accuracy. This is because the related camera module 40 comprises the four members (parts): the actuator body 11, the actuator base 12, the sensor base 44, and the sensor board 42. More specifically, when the actuator base 12 is mounted to the actuator body 11, the unevenness of position of ±20 μm occurs. In addition, when the sensor base 44 is mounted to the sensor board 42, the unevenness of position of ±20 μm occurs. Furthermore, when the actuator 10 is mounted to the sensor section (42, 44) with the X-Y adjustment, the unevenness of position of ±20 μm occurs. Accordingly, inasmuch as the unevenness of position of ±60 μm occurs in total, it is difficult to assemble the camera module 40 by positioning it with high precision.

A second problem is that the camera module 40 has a high cost. This is because, in order to assemble the actuator base 12 with the sensor base 44, it is necessary to provide with the sing-shaped convex portion 122 and the ring-shaped concave portion 442 preventing the entry of dirt and the entry of light in the manner which is described above. In addition, in order to assemble the actuator base 12 with the sensor base 44, it is necessary to subject evaporation processing of a shielding film to both of them to shield them in common.

Figure 3:
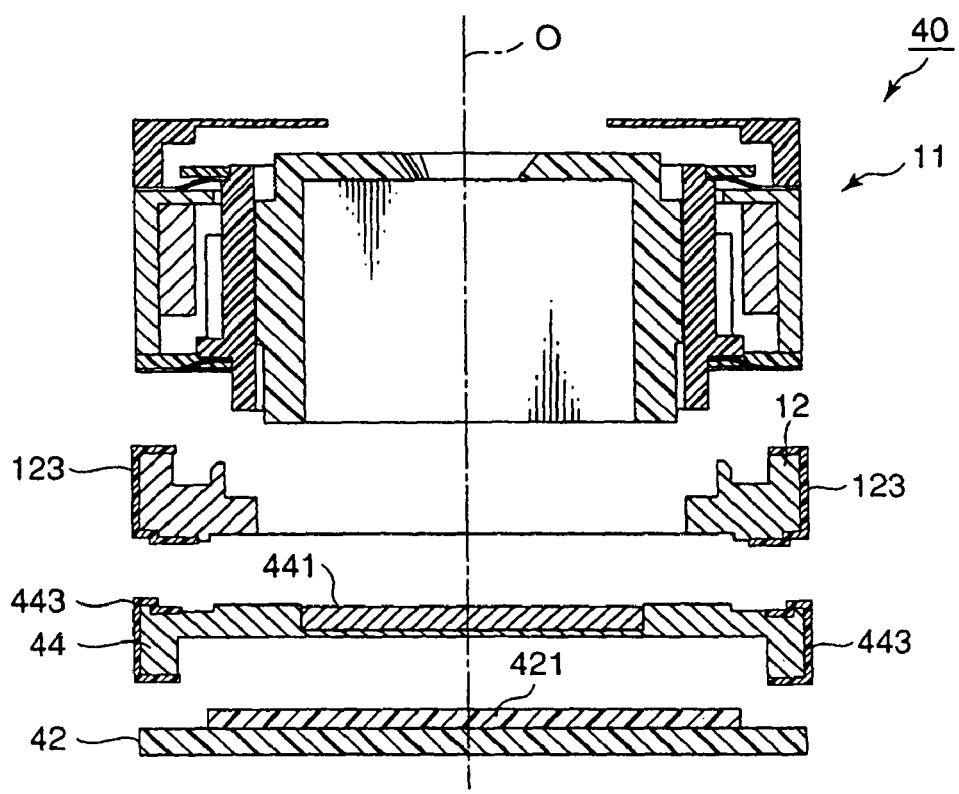
FIG. 3 is an exploded cross-sectional view of the related camera module showing a state where evaporation processing of a shielding film is subjected to an actuator base and a sensor base in order to shield them in common.

FIG. 3 shows an actuator shielding film 123 subjected to the actuator base 12 by evaporation processing and a sensor shielding film 443 subjected to the sensor base 44 by evaporation processing.

Figure 4:
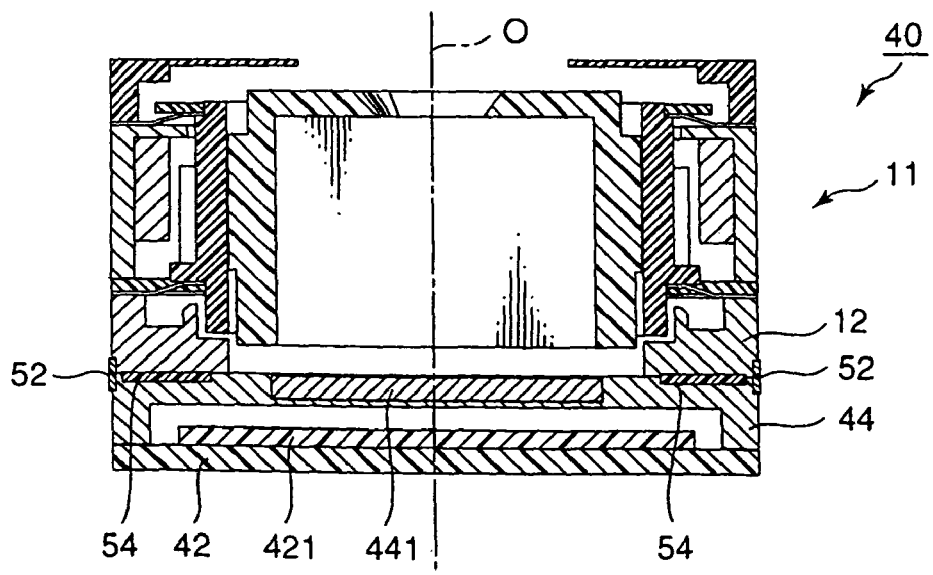
FIG. 4 is a cross-sectional view of the related camera module showing a state where a conductive resin is used between the actuator base and the sensor base.

Furthermore, in order to conduct between the actuator base 12 and the sensor base 44 subjected to evaporation processing of the shielding films, it is necessary to use a conductive resin 52 between the actuator base 12 and the sensor base 44 as shown in FIG. 4. This is because, when the actuator 10 is mounted to the sensor section (42, 44), thermosetting adhesive resin 54 is inserted therebetween as shown in FIG. 4, the continuity between the actuator base 12 and the sensor base 44 is hardly made and thereby becoming unstable.

A third problem is that it is difficult to lower a height of the camera module 40. This is because, inasmuch as the related camera module 40 comprises the four members (parts): the actuator body 11, the actuator base 12, the sensor base 44, and the sensor board 42, the height thereof becomes high due to thicknesses of the respective members (parts).

Figure 5:
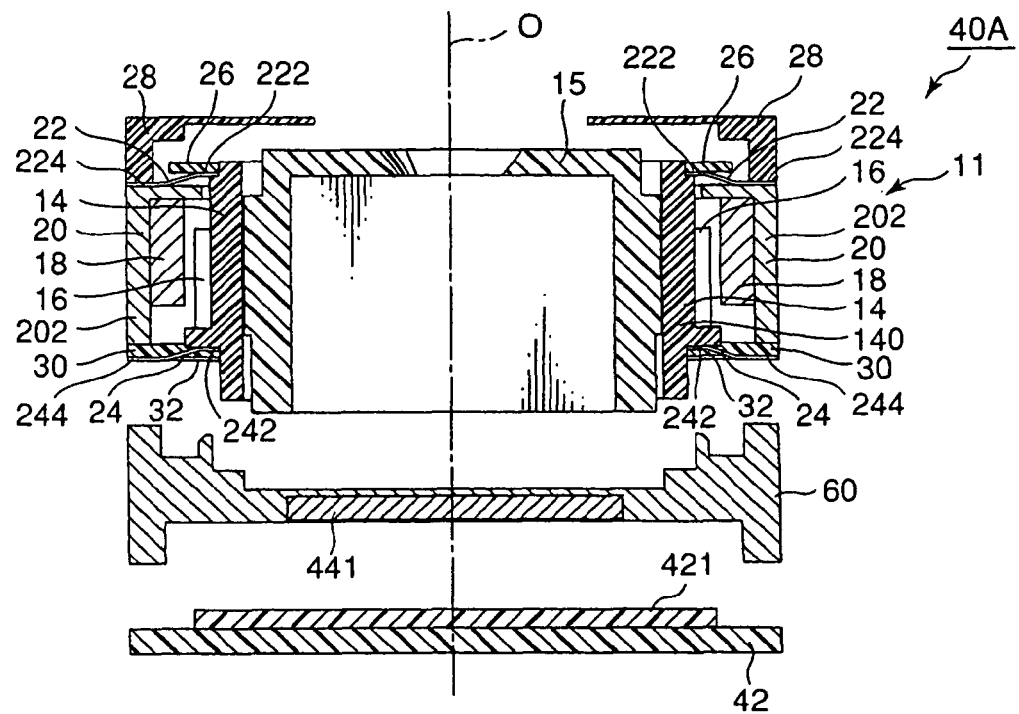
FIG. 5 is an exploded cross-sectional view of a camera module according to an exemplary embodiment of the present invention.

Referring to FIG. 5, the description will proceed to a camera module 40A according to an exemplary embodiment of this invention, FIG. 5 is an exploded cross-sectional view of the camera module 40A.

Herein, in the manner shown in FIG. 5, an orthogonal coordinate system (X, Y, Z) is used. In a state illustrated in FIG. 5, in the orthogonal coordinate system (X, Y, X), an X-axis direction is a fore-and-aft direction (a depth direction), a Y-axis direction is a left-and-right direction (a width direction), and a Z-axis direction is an up-and-down direction (a height direction). In addition, in the example being illustrated in FIG. 5, the up-and-down direction Z is a direction of an optical axis O of a lens.

However, in an actual use situation, the direction of the optical axis O, namely, the Z-axis direction becomes a fore-and-aft direction. In other words, an upper direction of the Z-axis becomes a front direction while a lower direction of the Z-axis becomes a rear direction.

The illustrated camera module 40A is similar in structure to the related camera module 40 illustrated in FIGS. 1 to 4 except that a base member 60 is used in lieu of the actuator base 12 and the sensor base 44. Accordingly, the same reference symbols are attached to components similar to those illustrated in FIGS. 1 to 4, differences alone will later be described in order to simplify the description.

The base member 60 is disposed between the actuator 11 and the sensor board 42. The base member 60 consists of one member serving as the actuator base 12 and the sensor base 44 in the related camera module 40. The base member 60 mounts the infrared cutting filter 441 thereon.

That is, the camera module 40A according to the exemplary embodiment comprises three members (parts): the actuator body 111 the base member 60, and the sensor substrate 42. A combination of the actuator body 11 and the base member 60 configures an actuator section (11, 60).

Now, description will be made as regards a method of manufacturing the camera module 40A illustrated in FIG. 5.

First, the infrared cutting filter 441 is mounted to the base member 60. At this time, a thermosetting adhesive resin is applied to them to cure the resin by thermocompression bonding. Subsequently, the actuator section (11, 60) is mounted to the sensor portion 42. At this time, a thermosetting adhesive resin is applied to them to cure the resin by thermocompression bonding. In the manner described above, the camera module 40 is manufactured.

The camera module 40 having such a structure has advantages as follows.

A first advantage is that it is possible to assemble the camera module 40A with high position accuracy. This is because the camera module 40A comprises the three members (parts): the actuator body 11, the base member 60, and the sensor board 42. More specifically, when the base member 60 is mounted to the actuator body 11, the unevenness of position of ±20 μm occurs. In addition, when the actuator section (11, 60) is mounted to the sensor board 42, the unevenness of position of ±20 μm occurs. Accordingly, it is possible to suppress the unevenness of position to ±40 μm in total. That is, it is unnecessary to adjust. It is therefore possible to assemble the camera module 40A by positioning with high precision.

A second advantage is that the camera module 40A has a low cost. This is because, inasmuch as it uses the base member 60 into which the actuator base 12 and the sensor base 44 are integrated, it is unnecessary to provide with the sing-shaped convex portion 122 and the ring-shaped concave portion 442 preventing the entry of dirt and the entry of light that are required in the related camera module 40. In addition, in order to shield the base member 60 acting as one member, it may subject evaporation processing of a shielding film to it.

Figure 6:
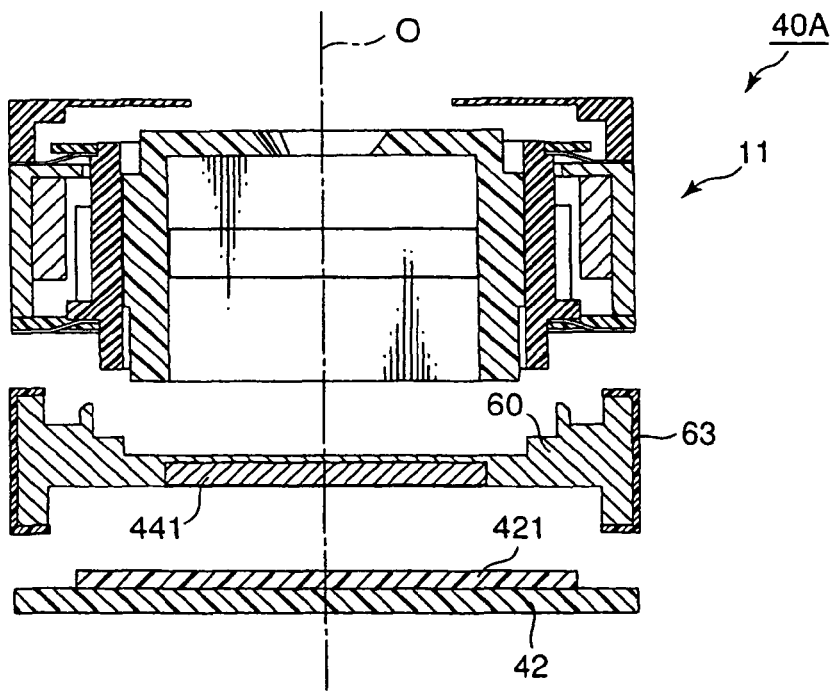
FIG. 6 is an exploded cross-sectional view of the camera module illustrated in FIG. 5, which shows a state where evaporation processing of a shielding film is subjected to a base member in order to shield it.

FIG. 6 shows a shielding film 63 subjected to the base member 60 by evaporation processing. That is, the shielding film 63 is evaporated to an outer side of the base member 60. Accordingly, it may subject evaporation processing of the shielding film to only one member.

Furthermore, it is unnecessary to use the conductive resin 52 (FIG. 4) between the actuator base 12 and the sensor base 44 as the related camera module 40.

A third advantage is that it is possible to lower a height of the camera module 40A. This is because, inasmuch as the camera module 40A comprises the three members (parts): the actuator body 11, the base member 60, and the sensor board 42, it is possible to lower the height thereof even if the thicknesses of the respective members (parts) are increased.

FIG. 7A shows a cross-sectional view of the related camera module 40 while FIG. 7B shows a cross-sectional view of the camera module 40 according to the exemplary embodiment.

As apparent from comparison between FIG. 7A and FIG. 7B, it is understood that the camera module 40A according to the exemplary embodiment has the height lower than that of the related camera module 40 by a height H.

This is because, inasmuch as the actuator base 12 and the sensor base 44 configures one base member 60, there is a margin with respect to strength of the members (parts) and limited size enable to manufacture. As a result, it is possible to increase a degree of flexibility in design of the parts and to lower the height of the parts in total.

Referring now to FIGS. 8 to 10, the description will proceed to a positioning between the sensor board 42 and the base member 60 in the camera module 40A according to the exemplary embodiment.

Figure 10A:
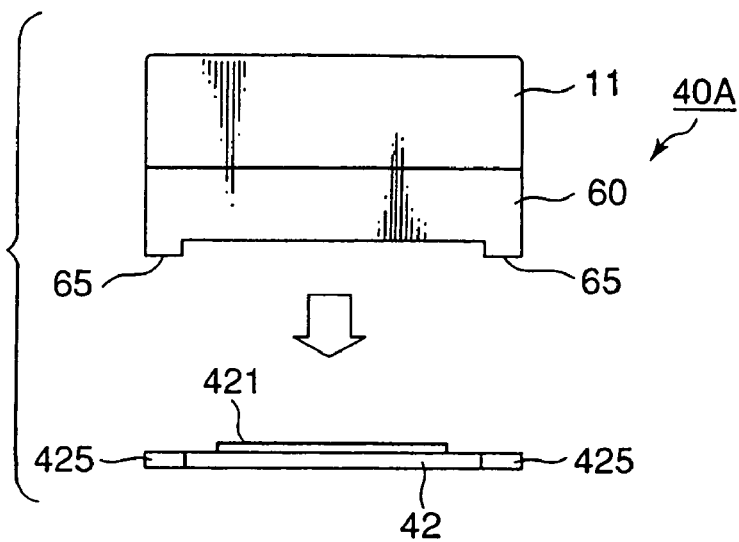
FIG. 10A is an exploded front view of the camera module before assembling it on carrying out positioning by assembling the actuator section with the sensor board.
Figure 10B:
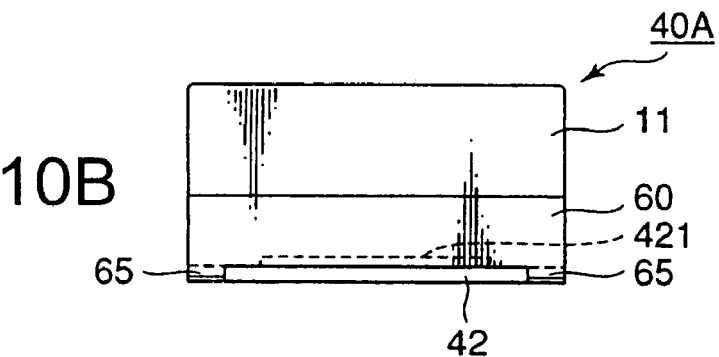
FIG. 10B is a front view of the camera module after it is assembled.

FIG. 8A is a plan view of the sensor board 42 while FIG. 8B is a front view of the sensor board 42. FIG. 9A is a front view of the actuator section (11, 60) while FIG. 9B is a bottom view of the actuator section (11, 60). FIGS. 10A and 10B show states where the positioning is carried out by assembling the actuator section (11, 60) with the sensor board 42. FIG. 10A is an exploded front view of the camera module 40A before assembling it. FIG. 10B is a front view of the camera module 40A after it is assembled.

As shown in FIGS. 8A, 8B, 9A, and 9B, the sensor board 42 and the base member 60 have rectangular shapes whose length and width dimensions are substantially equal to each other. The sensor board 42 has four positioning concave portions 425 provided at four corners thereof. On the other hand, the base member 60 has four positioning convex portions 65 provided at four corners thereof. That is, the four positioning convex portions 65 are provided at positions corresponding to the four positioning concave portions 425, respectively. A combination of the four positioning concave portions 425 and the four positioning convex portions 65 serves as a positioning member for positioning the sensor board 42 and the base member 60.

Accordingly, as shown in FIGS. 10A and 10B, by combining (fitting) the four positioning convex portion 65 of the base member 60 with the four positioning concave portions 425 of the sensor board 42, it is possible to carry out positioning between the actuator section (11, 60) and the sensor board 42.

Although a plurality of positioning concave portions 425 are provided to the sensor board 42 and a plurality of positioning convex portions 65 are provided to the base member 60 in the above-mentioned exemplary embodiment, conversely, a plurality of positioning convex portions may be provided to the sensor board 42 and a plurality of positioning concave portions may be provided to the base member 60.

In the camera module 40A according to the exemplary aspect of this invention, the base member 60 may mount the infrared cutting filter 441 thereon. The base member 60 may have the outer side onto which the shielding film 63 is evaporated. Preferably, the camera module 40A may further comprise the positioning member (425, 65) for positioning the sensor board 42 and the base member 60. The positioning member may comprise a plurality of positioning concave portions 425 provided to the sensor board 42 and a plurality of positioning convex portions 65 provided to the base member 60 at positions corresponding to the plurality of positioning concave portions. Desirably, the sensor board 42 and the base member 60 may have rectangular shapes which have substantially same length and width dimensions. In this event, the plurality of positioning concave portions 425 may be provided at four corners of the sensor board 42 while the plurality of positioning convex portions 65 may be provided at four corners of the base member 60.

The above-mentioned actuator body 11 may, for example, comprise the lens holder 14 including the tubular portion 140 for holding the lens assembly 15, the driving coil 16 fixed to the lens holder so as to position around the tubular portion, the yoke 20 comprising the permanent magnet 18 opposite to the driving coil, and the upper and the lower leaf springs 22 and 24 disposed both sides of the tubular portion of the lens holder in the direction of the optical axis O. The upper and the lower leaf springs 22 and 24 support the lens holder in the direction of the optical axis O shiftably so as to position the lens holder in a radial direction. In this event, each of the upper and the lower leaf springs comprises the inner end portion (222, 242) mounted to the lens holder 20 and the outer end portion (224, 244) mounted to the yoke 20. By energizing the driving coil 16, the lens holder 14 is positionally adjustable to the direction of the optical axis O according to interaction between a magnetic field of the permanent magnet 18 and a magnetic field due to a current flowing through the driving coil 16.

An exemplary advantage according to the invention is that it is possible to assemble the camera module with high position accuracy, to manufacture it at a low cost, and to lower the height thereof because the camera module comprises the three members (parts); the actuator body, the base member, and the sensor board.

While this invention has been particularly shown and described with reference to the exemplary embodiment thereof, the invention is not limited to the embodiment. It will be understood by those of ordinary skill in the art that various changes in form and details may be therein without departing from the spirit and scope of the present invention as defined by the claims. For example, the actuator body movably supporting the lens assembly along the direction of the optical axis of the lens is not limited to that of the above-mentioned exemplary embodiment and may adopt those having various structures.

What is claimed is:

1. A camera module comprising:
   an actuator body that movably supports a lens assembly along a direction of an optical axis of a lens;
   a sensor board on which an image pickup device is mounted;
   a base member disposed between said actuator body and said sensor board, said base member consisting of one member which acts as an actuator base and a sensor base.

2. The camera module as claimed in claim 1, wherein said base member mounts an infrared cutting filter thereon.

3. The camera module as claimed in claim 1, wherein said base member has an outer side onto which a shielding film is evaporated.

4. The camera module as claimed in claim 1, wherein further comprises a positioning member that positions said sensor board and said base member.

5. The camera module as claimed in claim 4, wherein said positioning member comprises:
   a plurality of positioning concave portions provided to said sensor board; and
   a plurality of positioning convex portions provided to said base member at positions corresponding to said plurality of positioning concave portions.

6. The camera module as claimed in claim 5, wherein said sensor board and said base member have rectangular shapes which have substantially same length and width dimensions,
   said plurality of positioning concave portions being provided at four corners of said sensor board, and
   said plurality of positioning convex portions being provided at four corners of said base member.

7. The camera module as claimed in claim 1, wherein said actuator body comprises:
   a lens holder including a tubular portion for holding said lens assembly;
   a driving coil fixed to said lens holder so as to position around the tubular portion;
   a yoke comprising a permanent magnet opposite to said driving coil; and
   upper and lower leaf springs disposed both sides of the tubular portion of said lens holder in the direction of the optical axis, said upper and lower leaf springs supporting said lens holder in the direction of the optical axis shiftably so as to position said lens holder in a radial direction,
   each of said upper and lower leaf springs comprising an inner end portion mounted to said lens holder and an outer end portion mounted to said yoke, whereby said lens holder is positionally adjustable to the direction of the optical axis, by energizing said driving coil, according to interaction between a magnetic field of said permanent magnet and a magnetic field due to a current flowing through said driving coil.

* * * * *